T. PERCIVAL.
Corn Husker.
No. 78,321.  Patented May 26, 1868.
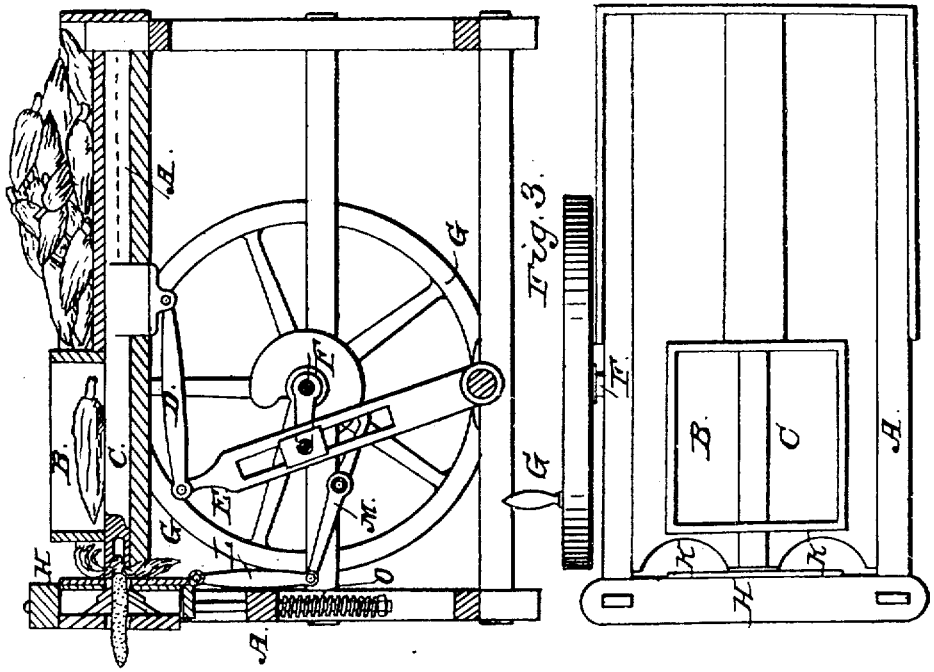
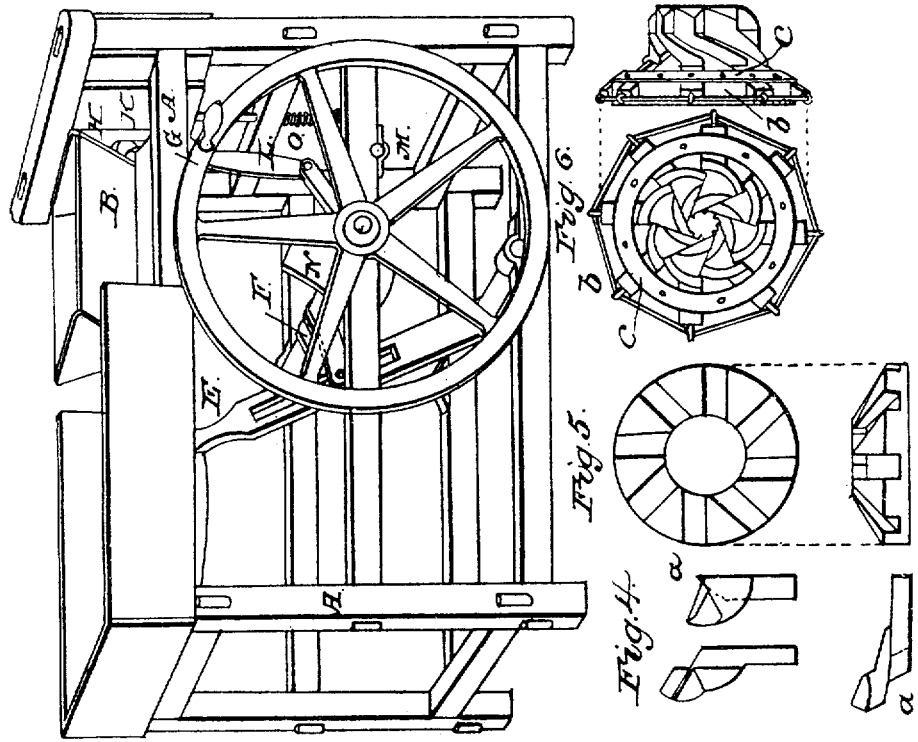
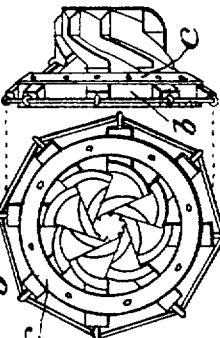
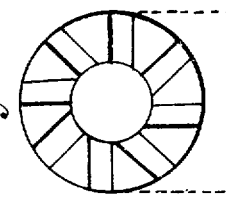
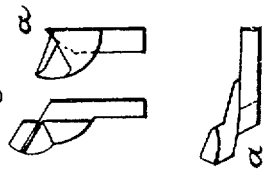
Witnesses  Inventor

United States Patent Office.

THOMAS PERCIVAL, OF AUGUSTA, MAINE.

Letters Patent No. 78,321, dated May 26, 1868.

IMPROVEMENT IN CORN-HUSKER.

*The Schedule referred to in these Letters Patent and making part of the same.*

TO ALL WHOM IT MAY CONCERN:

Be it known that I, THOMAS PERCIVAL, of the city of Augusta, in the county of Kennebec, and State of Maine, have invented a new and useful Improvement in Machinery for Husking Corn; and I do hereby declare that the following is a full, clear, and exact description of the same, reference being had to the accompanying drawing hereto attached, and making a part of these specifications, and to the letters of reference marked thereon.

The nature of my improvement consists in providing an improved form of stripper and butting-knife, for removing the husks from the ears of corn, and also in the several mechanical appliances by means of which the same are operated.

In the accompanying drawing—

Figure 1 represents a perspective view of the machine.

Figure 2 a vertical section,

Figure 3 a plan, and

Figures 4, 5, and 6, details of the construction of the stripper which removes the husks from the ears.

Similar letters refer to like parts in each of the figures.

I will now proceed to describe the construction and operation of the machine in detail.

Upon the top of a suitable framing, A A, is placed a hopper, B, of sufficient size to contain several ears of corn. The part of the top of the frame not covered by the hopper is so arranged as to form a receptacle for the corn which is to be husked.

The ears are fed by hand into the hopper, their points all being turned toward the more elevated part of the framing which contains the stripper. The sides of the hopper slope toward each other, so that though the hopper be filled, but one ear can reach the bottom at a time; but the ends are vertical. Beneath this hopper, and forming a portion of the bottom of the same, is a groove of sufficient size to admit an ear of corn. Sliding in this groove is a plunger, C, having a reciprocating motion of something more than the length of the hopper. Motion is communicated to this plunger by means of the link D, vibrating-lever E, and doubly-cranked shaft F, which are secured in suitable bearings in the framing.

The shaft F extends beyond the framing on one side, and bears upon its extremity the fly-wheel and winch-handle G, by means of which motion is communicated to the machine, either by hand or any convenient power, the fly-wheel being made with a flat face, to receive a strap or belt for that purpose. The link D might be attached to the crank-wrist F directly, without the intervention of the vibrating-lever E, but I prefer to use the lever, as it affords a means of giving to the plunger a comparatively slow and gradual movement, combined with a quick return.

When the plunger has moved back to the extent of its motion, an ear of corn, which has been placed in the hopper, will drop down into the groove before it, and will be carried out by its forward movement through an opening formed between the groove and the forward end of the hopper, and driven through the butting-knife H and stripper I.

The forward end of the plunger is hollowed out to admit the stems of the ears, so that in driving the ears forward, it presses, not upon the stems, but upon the bases of the ears only. This is done to prevent the varying length of the stems from interfering with the proper operation of the machine.

Beyond the hopper, the two uprights forming the end of the framing extend above the general elevation of the machine whereon the hopper is placed, and are enclosed between the transverse pieces or plates, between which the stripper is secured. Against the first of these two transverse pieces the butting-knife H is held by suitable guides, *k k*, which allow its proper motion.

The butting-knife consists of a plate of steel, having in its centre a round or oval hole, of sufficient size to permit the passage of an ear of corn, the size of the hole being bevelled to cutting-edges. It has in its guides an intermittent vertical reciprocating motion, derived through the link L and rock-shaft M from the cam N, on the crank-shaft F.

In the drawings the butting-knife is represented as receiving its downward motion from the tension of a spiral spring, O, the cam only serving to raise it up, but I prefer to dispense with the spring, and so form the cam as to give the knife a positive motion in both directions.

Through each of the before-mentioned transverse pieces a hole is cut, corresponding to the hole in the butting-knife when it is at its highest point, the centres of these holes being in a line corresponding to the axis of the plunger C. Between these transverse pieces the stripper I is secured, in such a manner that when it is closed together, as will be understood from its description hereafter, the parts containing the cutting or stripping-edges will project through the opening in the piece against which the butting-knife is secured, and correspond with the hole in the knife itself.

The office of the stripper is to split and strip off the husks from the ears as they pass through, leaving the husks attached to the ears only by means of their stems, which are then severed by the descent of the butting-knife, the husks dropping down inside the frame of the machine, while the ears pass on through the stripper to the outside of the frame, where they may fall into any receptacle suitably placed to receive them.

The stripper is composed of a number (six or more, by preference eight) of stripping-tools provided with cutting-edges, arranged about a point in a line corresponding to the axis of the plunger C, in such a manner as to form an expanding collar, capable of clasping and surrounding the ears with cutting-edges, to split and strip off the husks in the manner described.

The drawings of the machine are not of sufficient size correctly to exhibit the construction of the stripper.

Fig. 4 shows three of the stripping-tools in different positions. The cutting-edges are indicated by blue lines. The heads of the stripping-tools, which bear the cutting-edges, are in shape sectors of forty-five degrees, (if the stripper contain eight tools,) from a disk having a thickness equal to one-half its radius, but the curved angles opposite the principal cutting-edges are rounded away, for a purpose which will appear hereafter. The number of degrees in the sector will, however, depend on the number of tools of which the stripper is composed, thus: Angle of sector $= \frac{360°}{\text{number of tools.}}$ These heads are set upon necks, which may be regarded as portions of an oblique left-handed spiral, having a pitch equal to one and six-tenths times its diameter, and a horizontal section similar and equal to the sectors forming the bases of the heads; or, rather, they are such solids as would be generated by the motion of a sector equal to the bases of the heads through three-sixteenths of a left-handed revolution about a line perpendicular to the plane of the sector at its plane angle, and also moving through an arc of thirty degrees about a line perpendicular to that line, and perpendicular to the line bisecting the plane angle of the sector. The terminating-edge of the neck is, therefore, perpendicular to a line parallel with the line bisecting the plane angle of the base of the head, and the terminal plane of the neck has an inclination of thirty degrees to the plane of the base of the head.

I am thus particular in describing the form of these tools, because they will not operate properly unless made of the shape here indicated.

These necks are set upon stems or tangs, which are in shape rectangular prisms, obliquely truncated at the ends whereon the necks rest, by planes which make angles of forty-five degrees with the axes of the prisms horizontally, and of thirty degrees vertically. The longest edges of the prisms correspond with the terminal edges of the necks, and their acute angles fall directly under the plane angles of the heads. Upon the cutting-edge of the head of each tool, where it joins the plane angle, is raised a spur, $a$, which projects at a right angle with a line bisecting that plane angle. This spur is continued down along the neck and acute angle of the tang. It is thin and sharp where it joins the cutting-edge, but is broader, and rounded below.

The use of this spur is to split with its sharp edge the husks of the ears which pass along it, but, being blunt and smooth below, it slides upon the ear, and serves to bear off the cutting-edge, so as to prevent it from cutting or scraping the kernels while removing the husk.

The proper material for these tools is steel, or iron with the cutting-edges and spurs of steel laid on and welded.

Fig. 5 represents the cast-iron bed-piece, upon which the tools just described are secured. In shape, it is a very short hollow cylinder, terminated at one end by a hollow conic frustum, whose sides have an inclination of thirty degrees to its base. The diameter of the cylindrical part should be about three and one-half times that of the largest ear of corn, and its height should be equal to one and a half the thickness of the tangs of the tools. The diameter of the circle, terminating the frustum, should be equal to that of the openings through the transverse pieces of the frame of the machine, which is something less than that of the disk, whereof the tool-heads are sectors. In the convex surface of this frustum are formed a number of grooves, equal to the number of tools employed, of such breadth and depth as to admit the tangs of the tools, and allow them to slide easily therein. The sides of these grooves, corresponding to the longest sides of the tangs, are radial, and divide the convex surface of the frustum equally. Into these grooves the tangs of the tools are placed, and secured by means of a metal ring, which is screwed down over them, or they may be fastened in any other manner which will hold them in their places, and yet allow them to slide easily.

Fig. 6 shows the stripper complete, the bed-piece, with the tools in their places, held by means of the metal ring $c$. Rove through holes in the ends of the tangs of each of the tools, or through eye-bolts inserted therein, or attached by any other convenient mode of fastening, is an elastic vulcanized rubber band, $b$, whose tension draws the tools together. The figure represents the stripper a little open. It will be seen that when closed together the necks of the tools interlock, the heads forming a circular disk, the spurs in the centre and the cutting-edges radial. If, now, a pressure sufficient to overcome the tension of the rubber spring be applied to the face of the disk, the tangs will slide down the grooves of the conic bed-piece, and the heads of the tools expand outward, so that the cutting-edges cease to be radii of a circular disk, but form the sides of a regular polygonal opening, having as many sides as there are tools, and this opening will continue to enlarge, with increased pressure, until the tools have reached the extent of their outward motion. Upon cessation of the pressure the spring will return the tools to their former position.

If the point of an ear of corn be pressed against the centre of the stripper, the tools will recede and expand until the opening is sufficiently large to permit the ear to enter, when the sharp points of the spurs will split open the husks, and the cutting-edges push them off so that the naked ear alone will enter, the broader parts of the spurs sliding upon it so as to prevent the cutting-edges from injuring the kernels, as before stated.

The side view in fig. 6 shows the position of the stripper when placed in the machine, the conic bed-piece being securely bolted to the inner face of the transverse piece of the frame, which is farthest from the butting-knife, and the face of the stripper projecting through the openings in the other piece, and in the butting-knife. When an ear of corn begins to enter, the husks forced off, will therefore spread out in front of the butting-knife, as represented in fig. 2, so that when the plunger C has pressed the ear entirely through the knife, the knife's descent will completely sever the husk from the ear. The cam which gives motion to the knife is so shaped that the knife remains stationary, at its highest point, during the forward motion of the plunger, but instantly descends the moment the plunger has commenced its return, and resumes its former position while the plunger is receding. The curved angle opposite the cutting-edge of the stripping-tools is rounded away so that the stripper may expand and recede without those corners coming in contact with the sides of the opening through which it projects.

In lieu of the single rubber spring $b$, the closing of the stripper may be effected by the application of a separate metallic or other spring to the tang of each of the tools, if the change be deemed advisable, and the cutting-edges of the tools, instead of being straight and smooth, may be serrated or toothed, if their action be thereby improved.

Instead of there being in a machine but a single plunger, butting-knife, and stripper, two or more plungers, &c., may be employed and operated from the same crank-shaft, thus doubling or further multiplying the capacity of the machine.

In the machine for husking corn, set forth in the foregoing description, I claim as my invention, and desire to secure by Letters Patent—

1. The use of the expanding stripper I, composed of the several stripping-tools, as described, so arranged that the pressure of the ear will cause them to open to receive it, whether the closing of the same be effected by means of a single elastic rubber spring, or by other means, and whether their cutting-edges be straight or toothed, the whole operating in the manner and for the purpose substantially as described.

2. The butting-knife H, formed of a plate of steel, having through it a round or oval hole or holes, with bevelled cutting-edges, operating in the manner and for the purpose substantially as described.

3. The hollow-ended plunger C, constructed and operating in the manner and for the purpose substantially as described.

4. The combination and arrangement of parts of a machine for husking corn, when constructed and operating in the manner substantially as described.

Augusta, December 2, 1867.

THOS. PERCIVAL.

Witnesses:
   JNO. D. DEFREES,
   ROLLIN DEFREES.